US006545257B2

(12) United States Patent
Scruggs et al.

(10) Patent No.: US 6,545,257 B2
(45) Date of Patent: Apr. 8, 2003

(54) THERMAL-ELECTRICALLY COOLED PHOTODETECTOR

(75) Inventors: Michael K. Scruggs, Pompton Plains, NJ (US); Peter A. Wall, Bayonne, NJ (US); Ming-Hsing Yu, Wayne, NJ (US); Robert A. Kovacs, West Orange, NJ (US)

(73) Assignee: Honeywell International Inc., Morristown, NJ (US)

( * ) Notice: Subject to any disclaimer, the term of this patent is extended or adjusted under 35 U.S.C. 154(b) by 116 days.

(21) Appl. No.: 09/809,932

(22) Filed: Mar. 16, 2001

(65) Prior Publication Data

US 2001/0032922 A1 Oct. 25, 2001

Related U.S. Application Data

(60) Provisional application No. 60/190,660, filed on Mar. 20, 2000.

(51) Int. Cl.[7] .............................................. H01J 40/14
(52) U.S. Cl. .............................. 250/214 A; 250/231.12; 250/238
(58) Field of Search ...................... 250/214 R, 214.1, 250/238, 213.12; 356/459, 460, 461, 465; 372/38.01, 38.02, 29.02; 330/308, 309, 59, 58

(56) References Cited

U.S. PATENT DOCUMENTS

| 5,229,831 A | 7/1993 | Carroll et al. ............... 356/350 |
| 5,686,990 A | 11/1997 | Laznicka, Jr. ............... 356/350 |
| 6,359,918 B1 * | 3/2002 | Bielas ..................... 372/38.01 |

OTHER PUBLICATIONS

Patent Abstracts of Japan, vol. 012, No. 427 (P–784), Nov. 11, 1988, & JP 63 159712 A (Tokyo Keiki Co Ltd), Jul. 2, 1988 abstract.

* cited by examiner

Primary Examiner—Que T. Le

(57) ABSTRACT

A noise reducing thermal-electrically cooled photodetector for an Interferrometric Fiber Optic Gyro (IFOG) includes a photodiode that converts an optical power signal received from a coupler of the IFOG to an electrical compensation signal. The photodiode is in mechanical contact with one or more thermoelectric coolers (TEC) to lower an operating temperature of the photodiode. The photodetector also includes an amplifier circuit to amplify the electrical compensation signal. The amplifier circuit includes an operational amplifier having an input and an output, with a feedback resistor interposed between the input and output. The feedback resistor is also in mechanical contact with a TEC to lower an operating temperature of the feedback resistor. By reducing the operating temperature of the feedback resistor and the photodiode the thermal noise of the IFOG is reduced.

11 Claims, 4 Drawing Sheets

THERMAL-ELECTRICALLY COOLED PHOTODETECTOR

CROSS REFERENCE TO RELATED APPLICATION

This application claims the benefit of U.S. Provisional Application No. 60/190,660, filed Mar. 20, 2000, and incorporated by reference herein.

BACKGROUND OF THE INVENTION

1. Field of the Invention

The present invention relates to interferometric fiber optic gyros (IFOG), and more particularly to improving the total gyro linearity in an IFOG.

2. Description of the Related Art

There is a growing demand for high accuracy gyros for satellite pointing applications. In order to improve gyro sensitivity, it is necessary to lower the total gyro noise. In typical satellite pointing applications, an interferometric fiber optic gyro (IFOG) is employed. In the IFOG, noise elements arise from both the optical and electrical elements.

A closed loop IFOG is illustrated in FIG. 1. An IFOG generally includes a light source 10, a coupler 20, an integrated optics chip (IOC) 30, and a fiber coil 40, which comprise the optical circuit 5. The fiber coil 40 provides the rotation-sensitive interferometer. The processing electronics 45 of the IFOG generally comprise a photodetector 50, an amplifier/filter 60, an analog-to-digital converter (A/D) 70, a digital signal processor (DSP) 80, a digital to analog converter (D/A) 90 and amplifier 95.

The processing electronics 45 function to provide a feedback phase shift in the optical circuit 5 which effectively compensates a rotation-induced phase shift sensed in the fiber coil 40. The magnitude of the feedback phase shift is an indication of the rotation rate. The photodetector 50 converts an optical power output by optical coupler 20 to a corresponding voltage. The corresponding voltage is processed by amplifier/filter 60 and converted to a digital signal by A/D converter 70. A corresponding feedback signal is calculated in DSP 80, and fed back into the gyro via D/A converter 90 and amplifier 95.

A rotation about a rate input axis 41 of the fiber coil 40 produces input signals at the photodetector 50, which are denoted as "A" and "B" in FIG. 1A. A difference A-B corresponds to the sensed input rotation rate and is designated $D_{error}$. The input signal characteristics result from interference patterns of a counter within the light source 10, which propagates square wave modulated signals that travel in the fiber optic coil 40. The sharp spikes present in the waveform are a result of the modulated signals driving the interference patterns through the peak of the interference curves.

An accurate measurement of the magnitude of the A and B levels of the photodetected signals is crucial to the overall performance of the IFOG. However, this measurement accuracy is compromised by the presence of noise and optical spikes. A high gain is required to maintain closed loop performance. However, the high gain results in signal distortion due to saturation effects from the optical spikes in the signal processing electronics 45, most notably in the photodetector 50 and amplifier/filter 60.

Noise generated within the photodetector 50 also makes detection of the A and B levels difficult, which results in degraded performance within the IFOG.

A conventional photodetector 50 is further illustrated in FIG. 2. Referring to FIG. 2, the photodetector 50 is comprised of the photodiode 52, amplifier 54, and feedback resistor 55. The photodiode 52 is reverse biased to operate in a photoconductive mode, thereby optimizing the bandwidth and speed of the photodetector 50 while minimizing signal distortion.

In operation, the photodiode 52 converts optical power, received from the coupler 20, into a corresponding electrical current denoted as $I_{ph}$. The current flows through feedback resistor 55. In this configuration, the amplifier 54 provides an output voltage $V_{out}$, which is calculated using Equation 1 below:

$$V_{OUT} = -I_{ph} \cdot R_f \qquad \text{Equation 1}$$

where $R_f$ is the value of the feedback resistor.

The amplifier 54 provides amplification while maintaining a high input impedance with respect to the photodiode 52. The photodiode 52 and amplifier are selected based on parameters, such as bandwidth, amount of detected power, optical wavelength, available gain, etc. The photodetector 50 circuitry is typically realized in a hermetically sealed microcircuit package for ruggedness and shielding from external electric fields, as is commonly known in the art.

A disadvantage of the prior art photodetector 50, however, is the susceptibility of the photodiode 52 and feedback resistor 55 to thermal noise. As discussed above, a relatively high gain is required to maintain closed loop performance. Consequently, large resistance values are required in the photodiode 52 (equivalent resistance) and feedback resistor 55. This results in the generation of thermal noise in the photodiode 52 and feedback resistor 55. Thermal noise, also known as Johnson noise, is a well-documented phenomenon in which electronic noise signals are produced by the random thermal motion of charges in circuit elements. Thermal noise varies as a function of resistance and temperature. Thermal noise is a major contributor to the noise generated within the photodetector 50, which results in a degradation of IFOG performance, as discussed above.

Therefore, there is a need for a photodetector with reduced thermal noise generation.

SUMMARY OF THE INVENTION

It is therefore an object of the present invention to provide a photodetector having reduced thermal noise generation.

In accordance with an aspect of our invention the photodetector of an Interferrometric Fiber Optic Gyro (IFOG) includes a photodiode that converts an optical power signal received from a coupler of the IFOG to an electrical compensation signal and which photodiode is in mechanical contact with one or more thermal electrical coolers (TEC) to lower an operating temperature of the photodiode. The photodetector also includes an amplifier circuit to amplify the electrical compensation signal. The amplifier circuit includes an operational amplifier (OP-AMP) having an input and an output, with a feedback resistor interposed between the input and output. The feedback resistor is also in mechanical contact with a TEC to lower an operating temperature of the feedback resistor. In accordance with our invention by reducing the operating temperature of the feedback resistor and photodiode the thermal noise of the IFOG is also reduced.

BRIEF DESCRIPTION OF THE DRAWINGS

The above and other objects, features, and advantages of the present invention will become more apparent in light of the following detailed description of an exemplary embodiment thereof, taken in conjunction with the attached drawings in which.

DETAILED DESCRIPTION

Figures 1, 1A:
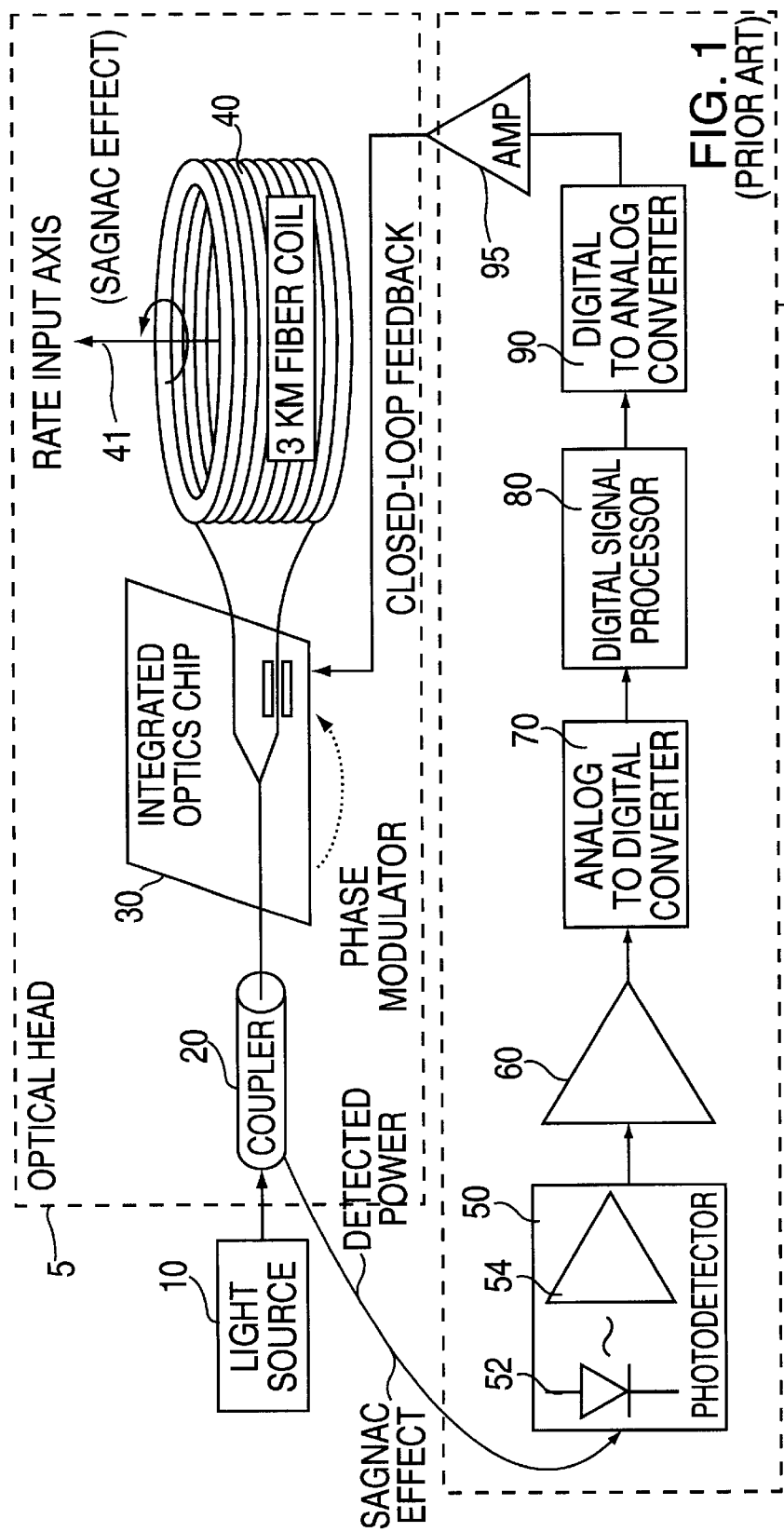
FIG. 1 is a block diagram illustrating a conventional IFOG.
FIG. 1A is a signal diagram illustrating input signals to a photodetector of the convention IFOG.
Figure 2:
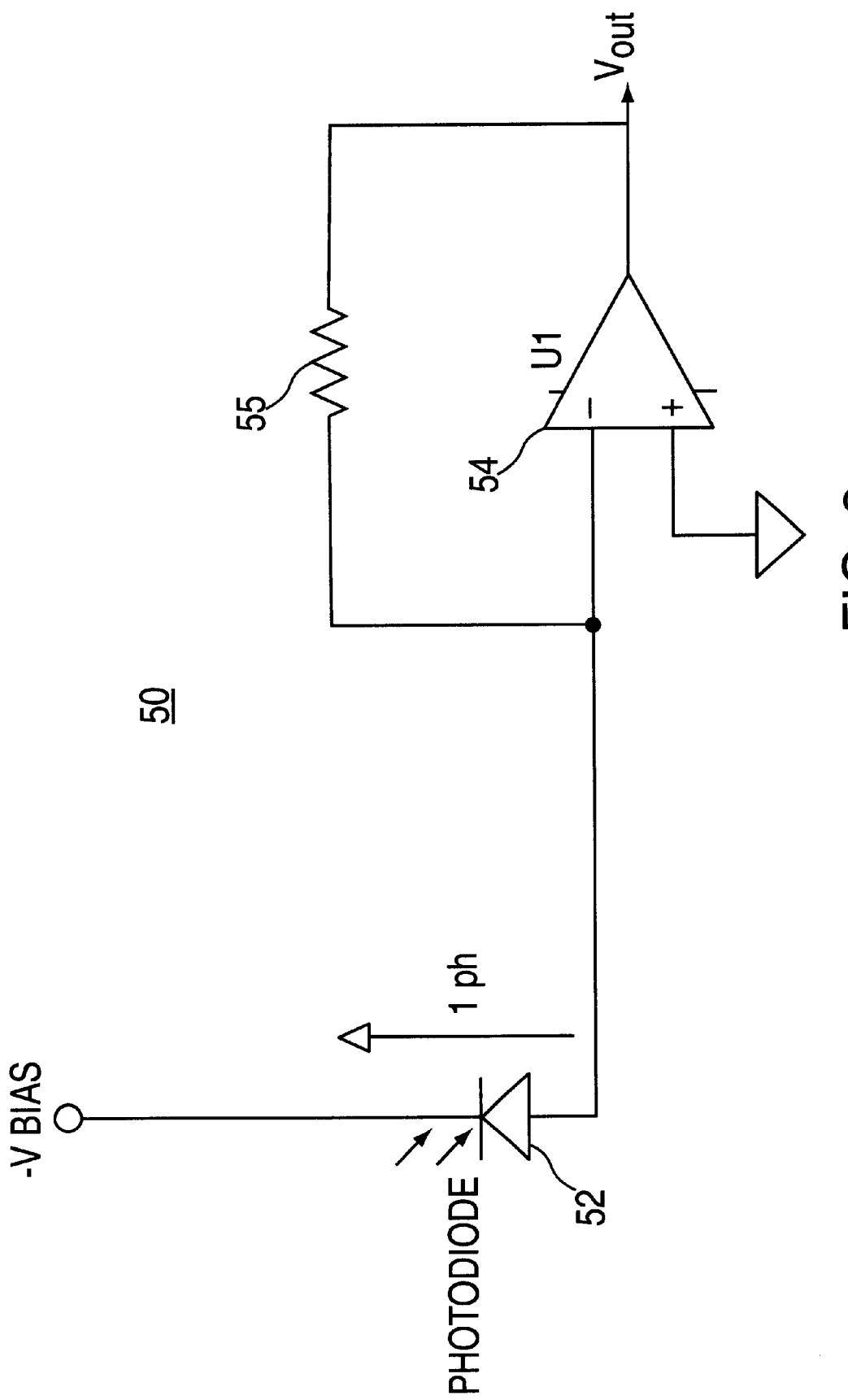
FIG. 2 illustrates a photodetector circuit of the conventional IFOG.
Figure 3:
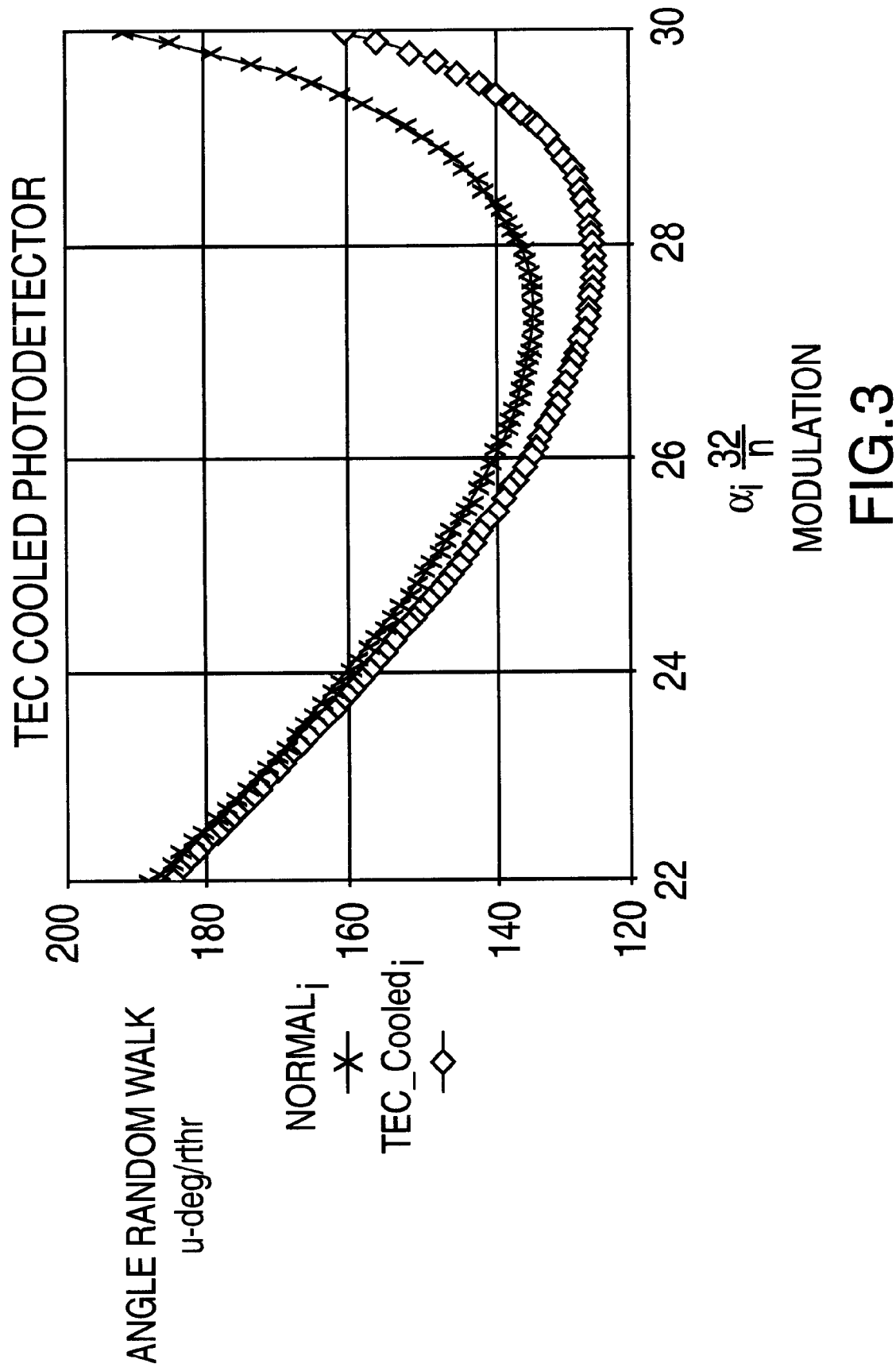
FIG. 3 is a schematic diagram of an illustrative embodiment of a photodetector circuit in accordance with our invention.

A photodetector circuit 60 for an interferrometric fiber optic gyro is depicted in FIG. 3. As can there be seen, a pair of thermoelectric coolers 61 and 62 are utilized, in accordance with our invention, to reduce thermal noise. Each thermoelectric cooler includes a hot plate 63 and a cold plate 64. As is known thermoelectric coolers are refrigeration devices based on the Peltier effect. When a direct electric current passes through a thermocouple of two dissimilar metals joined in two places, heat is absorbed at the cold junction or plate and dissipated at the hot junction or plate.

In accordance with an aspect of our invention, the photoelectric diode is directly physically mounted on the cold plate 64 of the first thermoelectric cooler 61 and the feedback resister 55 is directly physically mounted on the cold plate 64 of the second thermoelectric cooler, a control signal for the photodiode temperature being applied to an input 71 and a control signal for the feedback resistor temperature being applied at an input 72 for the variable direct current sources.

Thus in accordance with our invention, the operating temperatures of the diode 52 and the feedback resistor 55 can be lowered, under control by signals from an outside controller, thereby lowering their operating temperatures as may be desired to reduce thermal noise and thus the overall noise of the interferrometric fiber optic gyro. Advantageously, microcircuit packaging, as is well known in the art, may be employed to package the thermoelectric coolers and the photodiode and feedback resistor.

To appreciate the improvement in performance that may be attained with our invention, it should be remembered that at rest the output of an interferrometric fiber optic gyro, such as illustrated herein, is a random function that is the sum of a white noise and a slowly varying function corresponding to a long term drift of the mean value. The white noise is expressed in terms of the standard deviation of equivalent rotation rate per square root of detection bandwidth, commonly expressed as degrees per root hour (deg/rthr), which is known as Angle Random Walk (ARW).

Figure 4:
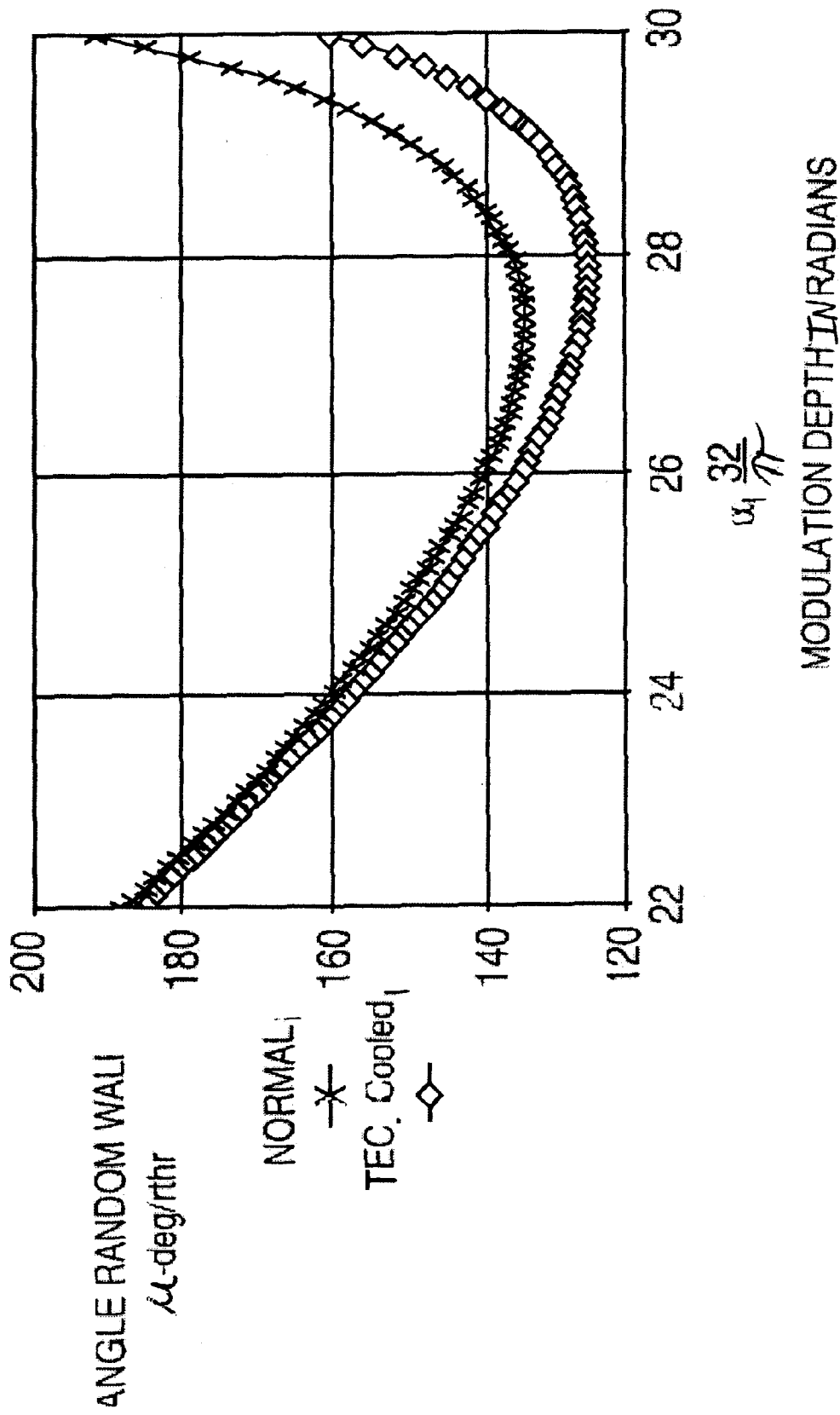
FIG. 4 is a graph illustrating a model output of the improved photodetector in accordance with the present invention.

The improved performance is illustrated by the graphs of FIG. 4, which compares the ARW or noise as a function of the gyro parameters, electronic and optic characteristics, and temperature for the prior art situation wherein all of the components are operated at the same temperature, and in accordance with our invention wherein the photodiode 52 and the feedback resistor 55 are operated at a lower temperature due to the inclusion in the circuit of the thermoelectric coolers 61 and 62, respectively. As depicted, the AWR or noise is measured in micro-degrees per root hour while the modulation or modulation depth is expressed in radians. In operation, both the feedback resistor 55 and photodiode 52 dissipate very little power, allowing the thermoelectric coolers 61 and 62 to provide substantial operating temperature reductions. A typical multi-stage may provide a temperature differential of 130° K.

A model output corresponding to a peak optical power of 35 w measured at the photodetector 50 of the prior art and photodetector 60 in accordance with our invention is illustrated in FIG. 4. The noise model displays ARW as a function of optical modulation. FIG. 4 illustrates that, in accordance with the present invention, for a given optical power there is an optimum optical modulation that produces the lowest ARW. As can be appreciated from FIG. 4, a thermally cooled detector 60 receiving 35 w of power attains a minimal ARW of approximately 124 u-deg/rthr at its optimum optical modulation of approximately 28 radians. However, a prior art detector 50 not subject to thermal cooling achieves, at best, an ARW of approximately 134 u-deg/rthr.

Accordingly, the improved thermal-electrically cooled photodetector 60 of the present invention advantageously reduces the thermal noise of an interferrometric fiber optic gyro.

While the present invention has been shown and described with reference to a specific illustrative embodiment, it is only one representation of our invention. Thus, while separate thermoelectric coolers 61 and 62 have been depicted in the embodiment of FIG. 3, a single larger thermoelectric cooler could be employed in common for both the photodiode 52 and feedback resistor 55. Further, improvements may be attained in accordance with our invention in embodiments wherein only one of the diode 52 and feedback resistor 55 are positioned in contact with a thermoelectric cooler. Thus, it is to be clearly understood that many variations can be made by anyone having ordinary skill in the art while staying within the scope and spirit of the present invention as defined by the appended claims.

What is claimed is:

1. A photodetector for an optical gyro, said photodetector comprising a photodiode that converts an optical power signal received from a coupler of the gyro to an electrical compensation signal, and an amplifier circuit that a amplifies the electrical compensation signal, said amplifier circuit including an amplifier having an input and an output and a feedback resistor interposed between said input and said output, at least one of said photodiode and said feedback resistor being in thermal contact with a thermoelectric cooler.

2. The photodetector in accordance with claim 1 further comprising a variable source of direct current connected to said thermoelectric cooler to determine the temperature of said at least one of said photodiode and said feedback resistor.

3. The photodetector in accordance with claim 2 wherein said thermoelectric cooler comprises a cold plate and a hot plate, said cold plate being in direct thermal contact with said at least one of said photodiode and feedback resistor.

4. The photodetector in accordance with claim 2 wherein both said photodetector and said feedback resistor are in direct thermal contact with a thermoelectric electric cooler.

5. The photodetector in accordance with claim 4 wherein said photodetector is in direct thermal contact with a first thermoelectric cooler and said feedback resistor is in direct thermal contact with a second thermoelectric cooler.

6. A noise reducing thermal-electrically cooled photodetector for an Interferrometric Fiber Optic Gyro (IFOG), said photodetector comprising:
- a photodiode that converts an optical power signal received from a coupler of the gyro to an electrical compensation signal, said photodiode being in thermal contact with a thermoelectric cooler to lower the operating temperature of the photodiode, and
- an amplifier circuit that amplifies the electrical compensation signal, said amplifier circuit comprising an operational amplifier having an input and an output and a feedback resistor interposed between said input and said output.

7. The photodetector in accordance with claim 6 further comprising a second thermoelectric cooler in thermal contact with said feedback resistor.

8. The photodetector in accordance with claim 7 wherein said thermoelectric coolers each includes a cold plate and a hot plate and said photodiode and said feedback resistor are in direct thermal contact with said cold plates.

9. The photodetector in accordance with claim 6 further comprising a source of variable direct current connected to said thermoelectric cooler to determine the operating temperature of said photodiode.

10. A noise reducing thermally cooled photodetector circuit for an interferrometric fiber optic gyro, said photodetector comprising:
- a photodiode that converts an optical power signal received from a coupler of the gyro to an electrical compensation signal,
- an amplifier circuit that amplifies the electrical compensation signal, said amplifier circuit including an operational amplifier having an input and an output and a feedback resistor interposed between said input and said output,
- a thermoelectric cooler thermally in contact with said feedback resistor, and
- a variable source of direct current connected to said thermoelectric cooler to cause said thermoelectric cooler to lower the temperature of said feedback resistor.

11. The photodetector in accordance with claim 10 wherein said thermoelectric cooler includes a hot plate and a cold plate and said feedback resistor is in direct thermal contact with said cool plate.

* * * * *